UNITED STATES PATENT OFFICE.

JAMES G. KELLY, OF SEDALIA, MISSOURI, ASSIGNOR OF ONE-HALF TO HOLMES HALL, OF SEDALIA, MISSOURI.

FLUX FOR SOLDER FOR ALUMINUM.

1,321,454. Specification of Letters Patent. Patented Nov. 11, 1919.

No Drawing. Application filed February 10, 1919. Serial No. 276,199.

*To all whom it may concern:*

Be it known that I, JAMES G. KELLY, a citizen of the United States, residing at the city of Sedalia, in the county of Pettis and State of Missouri, have invented certain new and useful Improvements in Fluxes for Solder for Aluminum, of which the following is a specification.

This invention consists in an improvement in fluxes for solders for uniting aluminum, and can be used not only for uniting two parts both made of aluminum, but, also, two parts one of which is aluminum and the other of some other material, as, for instance, brass or copper.

Attempts have heretofore been made to produce a solder for joining aluminum parts, but the results have not been satisfactory. Moreover, in using prior aluminum solders it has been necessary to soak in a suitable pickle the parts to be joined, which takes much time and delays the soldering process, besides involving the cost of the pickling material. In some instances the parts to be joined by such prior solders have been painted with a suitable acid preparatory to soldering.

In the use of the invention forming the subject-matter hereof, the parts do not need to be prepared by either pickling or the use of acid. All that is necessary is that the adjoining ends or edges or parts shall be scraped clean with a suitable knife or scraper.

In using prior solders for aluminum, it has been necessary to use the oxy-acetylene welding process, but the solder of this invention can be used with an ordinary soldering iron, preferably heated as hot as possible, and preferably to a substantial extent hotter than when used for soldering tin.

The solder with which this flux is preferably to be used is compounded substantially as follows:

Fifteen ounces (15 oz.) of zinc, seventeen ounces (17 oz.) of lead, and seventeen ounces (17 oz.) of block tin are combined together by the following process: First, the zinc is melted; then the lead is melted; and then the block tin is melted. Each is kept thoroughly stirred while being melted. When the three ingredients have been melted, then they are thoroughly mixed together by stirring for about four (4) minutes. The mixture is then poured into a mold and allowed to harden. While the above is the preferred formula, yet the same has been used with the addition thereto of one ounce (1 oz.) of aluminum with satisfactory results.

When it is desired to use this solder, the soldering-iron, heated as above stated, is first rubbed over the parts to be united. Then the hereinafter-described flux is rubbed over the said parts. Then the hot soldering-iron is rubbed on sal ammoniac. Then the above-described aluminum solder is applied to the parts to be united with the soldering-iron, used in the usual way, the said parts being kept well fluxed during the soldering operation and the soldering-iron being frequently rubbed over the sal ammoniac during that operation, which is continued until the parts are thoroughly tinned or covered over with this aluminum solder, after which common solder, such as used in soldering tin, can be applied in the usual way, but using the above-mentioned flux (hereinafter described) while doing so.

Of course, it is to be understood that the ordinary solder will not stick to aluminum, but after the above-described aluminum solder has been applied to aluminum ordinary solder for tin will stick to it.

In use, a soldering-iron will be prepared in the usual manner by tinning the same with this solder. After the iron has been thus tinned, the cleaned parts to be joined are treated with the said flux and are so tinned with this solder by constantly rubbing with the iron, and the heat of the soldering iron is applied in the customary method of soldering to the strip or block of this solder, which is held adjacent to the joint to be made, and the union takes place.

If desired, a blow-pipe or oxy-acetylene welding apparatus may be used after the parts to be joined have been tinned as above described by the use of the iron.

The method of melting this solder at the joint is the same as practised with any other solder. On account of the ingredients of this article and the method in which they are combined together, the resultant joint is stronger than the aluminum itself.

It is well known that lead will not unite with certain substances, as, for instance, aluminum, but it has been found in practice that this solder can be used to prepare the surface of aluminum for union with lead where that is desired, in which use of this solder the aluminum is first tinned with this solder and thereupon ordinary soft solder can be used to form a union with the said tinned part of the aluminum article, there being no antipathy of the lead in the soft solder to union with this solder.

In this article the zinc is used for strength and the tin for its more readily fusible quality.

The said flux may consist of skunk oil alone or of the same combined with melted mutton tallow or of skunk oil combined with stearic acid, the proportions being immaterial.

I claim:

1. A flux for an aluminum solder having skunk oil as the main ingredient.

2. A flux for aluminum solder made up of skunk oil and melted mutton tallow.

I testimony whereof I hereunto affix my signature.

JAMES G. KELLY.